US007899387B2

(12) United States Patent
Ogawa

(10) Patent No.: US 7,899,387 B2
(45) Date of Patent: Mar. 1, 2011

(54) DRIVE SWITCHING MECHANISM AND IMAGE FORMING APPARATUS INCLUDING SAME

(75) Inventor: Hiroyoshi Ogawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 824 days.

(21) Appl. No.: 11/777,478

(22) Filed: Jul. 13, 2007

(65) Prior Publication Data

US 2008/0044212 A1 Feb. 21, 2008

(30) Foreign Application Priority Data

Aug. 17, 2006 (JP) ................................ 2006-222183

(51) Int. Cl.
*G03G 15/00* (2006.01)
*F16H 3/34* (2006.01)

(52) U.S. Cl. ........................................ 399/401; 74/354

(58) Field of Classification Search ................. 399/401; 74/354

See application file for complete search history.

(56) References Cited

U.S. PATENT DOCUMENTS

| | | | | | |
|---|---|---|---|---|---|
| 4,728,975 | A | * | 3/1988 | Ohara et al. | 396/418 |
| 5,456,419 | A | * | 10/1995 | Ezawa | 242/356 |
| 5,899,591 | A | * | 5/1999 | Aoshima | 396/413 |
| 5,937,262 | A | * | 8/1999 | Cho | 399/401 |
| 5,974,283 | A | * | 10/1999 | Cho | 399/75 |
| 6,030,135 | A | * | 2/2000 | Imai | 400/621 |
| 2004/0032074 | A1 | * | 2/2004 | Park | 271/4.01 |

FOREIGN PATENT DOCUMENTS

| | | | | |
|---|---|---|---|---|
| JP | 11258861 | A | * | 9/1999 |
| JP | 2002-104706 | A | | 4/2002 |
| JP | 2005-202090 | A | | 7/2005 |

* cited by examiner

*Primary Examiner* — Daniel J Colilla
*Assistant Examiner* — Allister Primo
(74) *Attorney, Agent, or Firm* — Sughrue Mion, PLLC

(57) ABSTRACT

A drive switching mechanism includes a first gear, a second gear, a support member for movably supporting the first gear and the second gear, and a switching unit that moves the support member to reverse an output direction of the first gear and the second gear.

18 Claims, 5 Drawing Sheets

DRIVE SWITCHING MECHANISM AND IMAGE FORMING APPARATUS INCLUDING SAME

CROSS-REFERENCE TO RELATED APPLICATIONS

This application is based on and claims priority under 35 USC 119 from Japanese Patent Application No. 2006-222183 filed Aug. 17, 2006.

BACKGROUND

1. Technical Field

The present invention relates to a drive switching mechanism and an image forming apparatus including such mechanism.

2. Related Art

An image forming apparatus such as a printer, copier, or facsimile machine provided with a sheet turnover unit, including a drive switching unit for reversing the paper driving direction is known.

SUMMARY

An aspect of the present invention resides in a drive switching mechanism including a first gear, a second gear, a support member for movably supporting the first gear and the second gear, and a switching unit that moves the support member to reverse an output direction of the first gear and the second gear.

BRIEF DESCRIPTION OF THE DRAWINGS

Exemplary embodiments of the present invention will be described in detail based on the following figures, wherein:

FIGS. 3A and 3B outline the drive switching device embodied herein, wherein FIG. 3A is a front view and FIG. 3B is a side view of the drive switching device;

DETAILED DESCRIPTION

Then, exemplary embodiments of the present invention are described based on the drawings.

Figure 1:
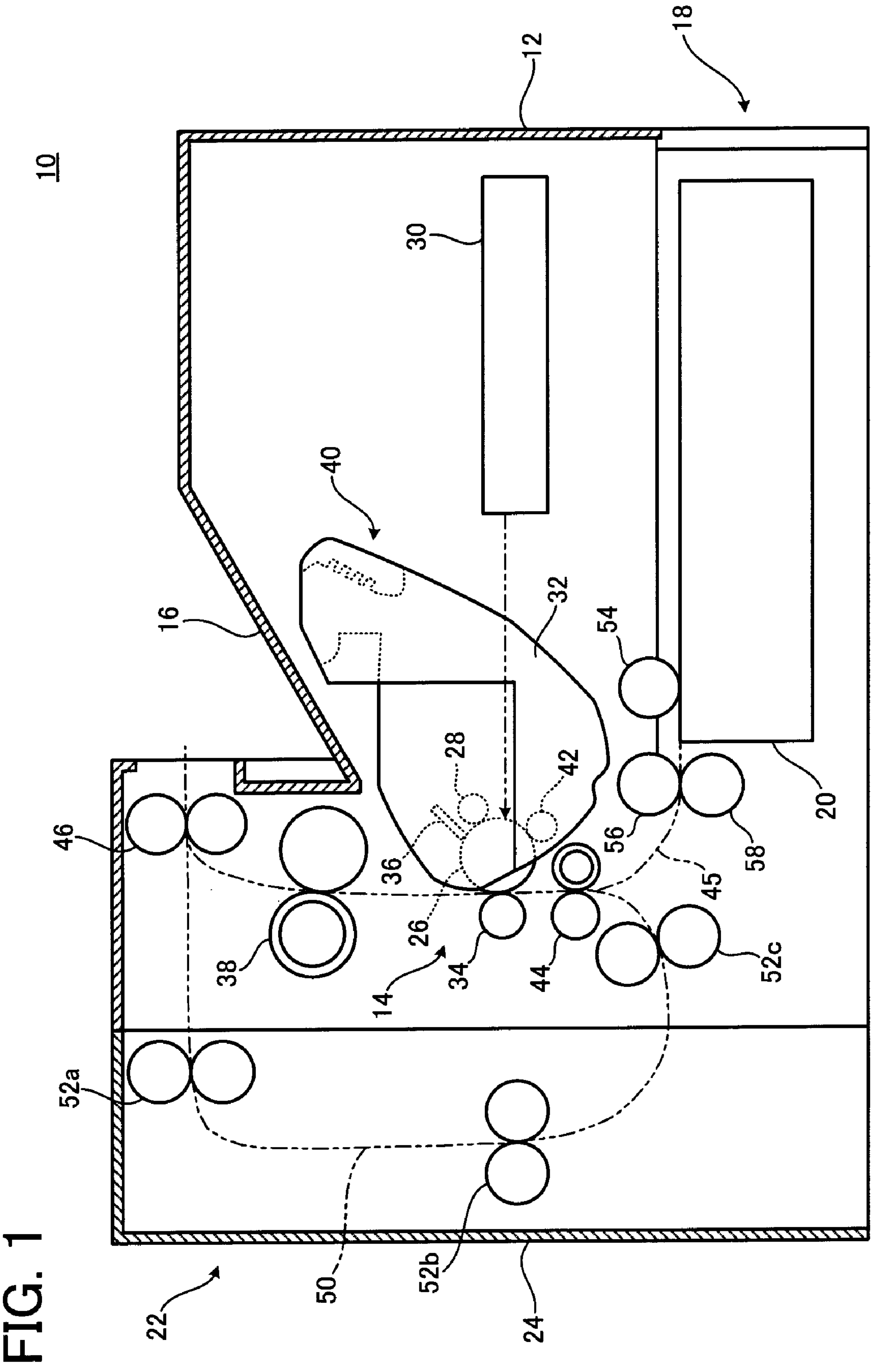
FIG. 1 is a cross sectional diagram of an image forming apparatus according to an exemplary embodiment of the present invention.

FIG. 1 shows an outline of an image forming apparatus 10 embodied herein according to the present invention. The image forming apparatus 10 has an image forming apparatus main body 12. An image forming unit 14 is installed inside the image forming apparatus main body 12 and an output tray 16 is provided on the top of the image forming apparatus main body 12. In the lower part of the image forming apparatus main body 12, a paper feeder 18 which will be described later is installed. A sheet turnover unit 22 is removably attached to the rear side (left side in FIG. 1) of the apparatus main body 12. The sheet turnover unit 22 has a sheet turnover unit main body 24 in which a reverse path 50 which will be described later is provided.

The image forming unit 14 is, for example, of an electrophotographic type, and composed of the following: an image carrying body 26 made of a photoreceptor; a charging device 28 that charges the image carrying body 26 evenly, wherein the charging device 28 is formed of, for example, a charging roller; an optical projection device 30 that, by light irradiation, projects a latent image onto the image carrying body 26 charged by the charging member 28; a development device 32 that applies a developer to a latent image formed on the image carrying body 26 by the optical projection device 30, thus making the latent image visible; a transfer device 34 that transfers a developer image created by the development device 32 onto a sheet, wherein the transfer device 34 is formed of, for example, a transfer roller; a cleaning device 36 that clears remaining developer particles from the image carrying body 26, wherein the cleaning device 36 is formed of, for example, a blade; and a fixing device 38 that fuses and fixes the developer image on the sheet, transferred by the transfer device 34, to the sheet, wherein the fixing device 38 is formed of, for example, a pressure roller and a heating roller. The optical projection device 30 is formed of, for example, a scan-type laser illumination device. This device is placed in parallel with a paper cassette 20 in the paper feeder 18 and nearer to the front (right side in FIG. 1) of the image forming apparatus main body 12, and emits light that passes across the development device 32 and irradiates the image carrying body 26. The development device 32 includes a development roller 42 positioned in contact with the outer surface of the image carrying body 26.

A process cartridge 40 is a cartridge in which the image carrying body 26, the charging device 28, the development device 32, and the cleaning device 36 are integrated. The process cartridge 40 is positioned directly under the output tray 16 and this cartridge is removably installed in the apparatus main body 12.

In the apparatus main body 12, for example, registration rollers 44 are placed upstream of the transfer device 34 (beneath the transfer device 34 in FIG. 1). From the paper feeder 18, a sheet guided onto a transport path 45 and transported is temporarily stopped by the registration rollers 44. The sheet is moved into the image forming unit 14 at appropriate timing. After an image is produced on the sheet, the sheet is outputted by output rollers 46 to the output tray 16.

In the case of both-side printing, however, the sheet gets back to the reverse path 50. Specifically, there is a two-way divergence just before the output rollers 46 and a switching pawl (not shown) is provided at the divergence. The reverse path 50 is formed for going back from the divergence to the registration rollers 44. Transport rollers 52*a* to 52*c* are provided along the reverse path 50. In the case of both-side printing, the switching pawl (not shown) is placed to a position to open the reverse path 50 and the output rollers 46 rotate reversely when a part of the sheet has been outputted out of the apparatus main body 12. The sheet is reversed and guided to the reverse path 50 in the opposite direction to the output tray 16. The sheet is transported again to pass the registration rollers 44, a nip between the transfer device and the image carrying body 26, and to the fixing device 38, and then outputted to the output tray 16.

The paper feeder 18 includes the paper cassette 20, a pickup roller 54, a feed roller 56, and a retard roller 58. The pickup roller 54 abuts on a top one of sheets stacked in the paper cassette 20 and picks up the sheet. The feed roller 56 and the retard roller 58 are positioned to contact with each other, downstream of the pickup roller 54, and work together for sheet by sheet feeding to feed only the top sheet picked up by the pickup roller 54.

Figure 2:
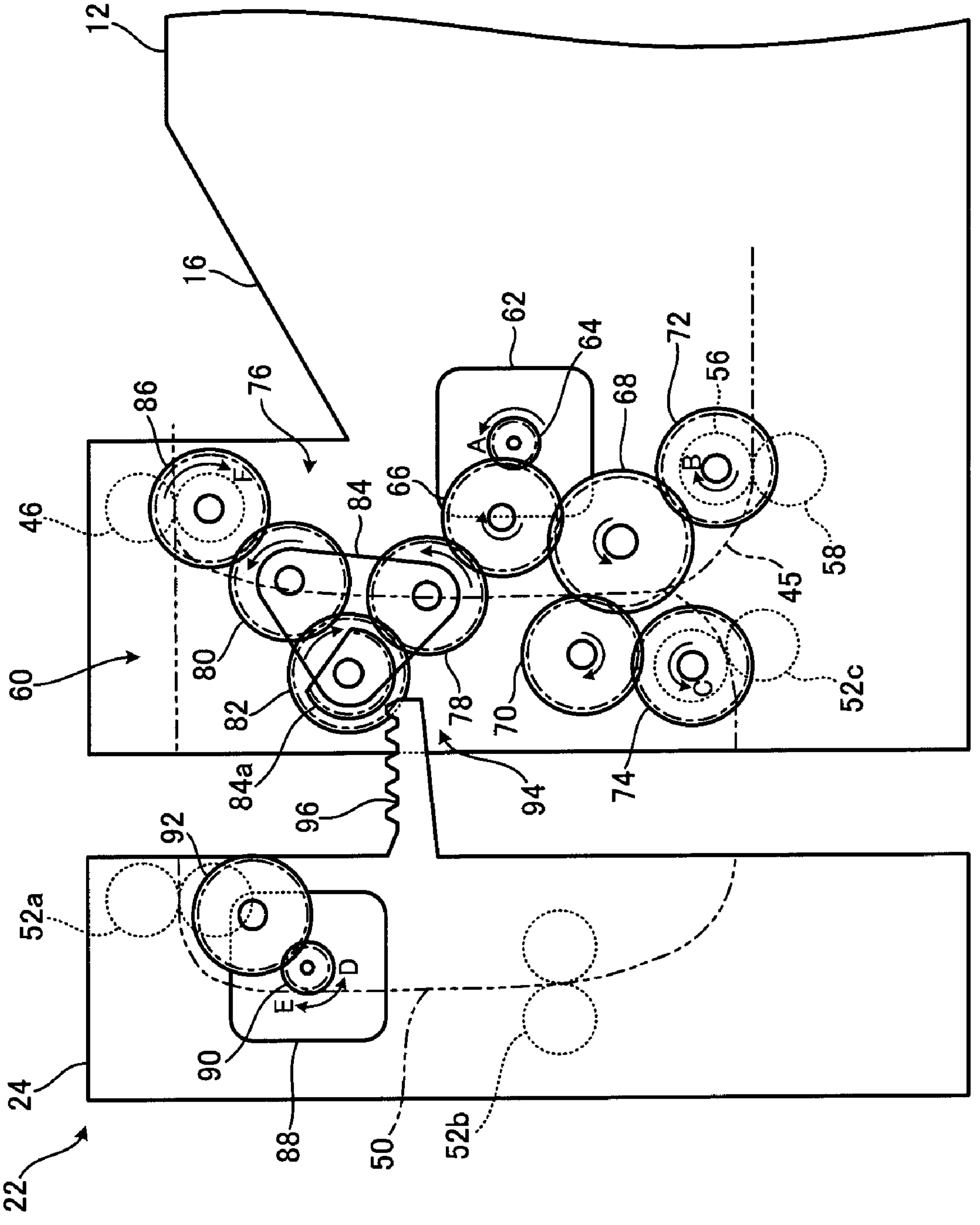
FIG. 2 is a cross sectional diagram illustrating a configuration of a drive switching device and its periphery, when a sheet turnover unit embodied herein is detached from the image forming apparatus main body.
Figure 3B:
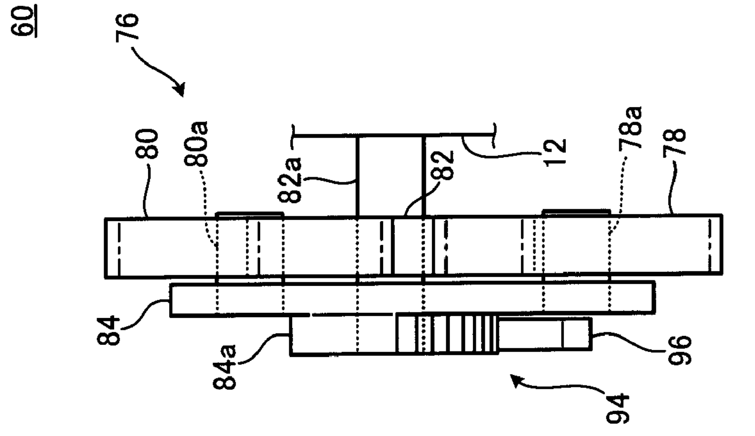
Figure 3A:
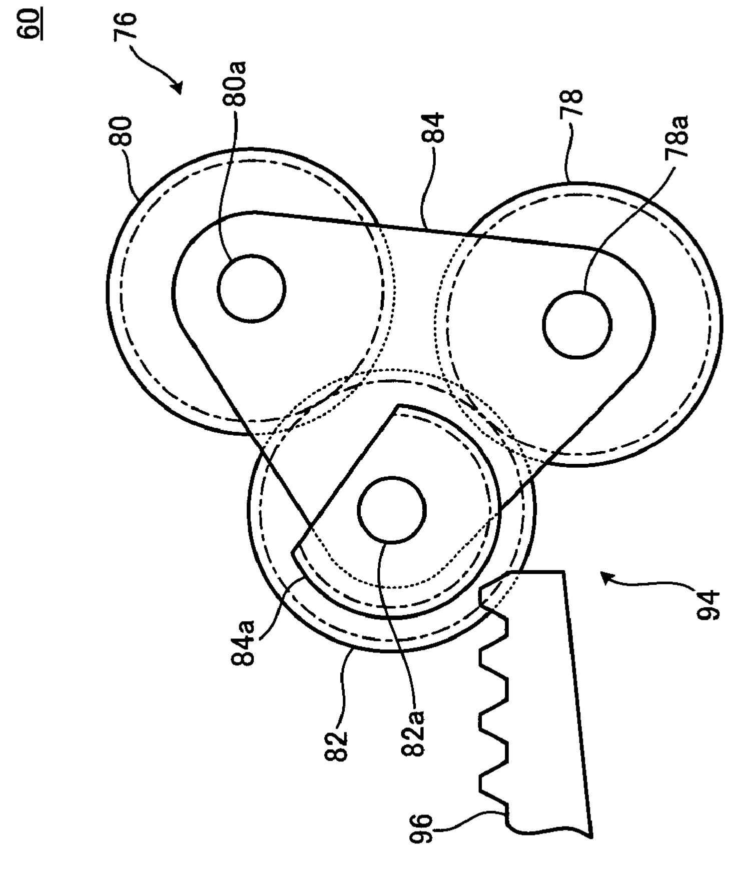
Figure 4:
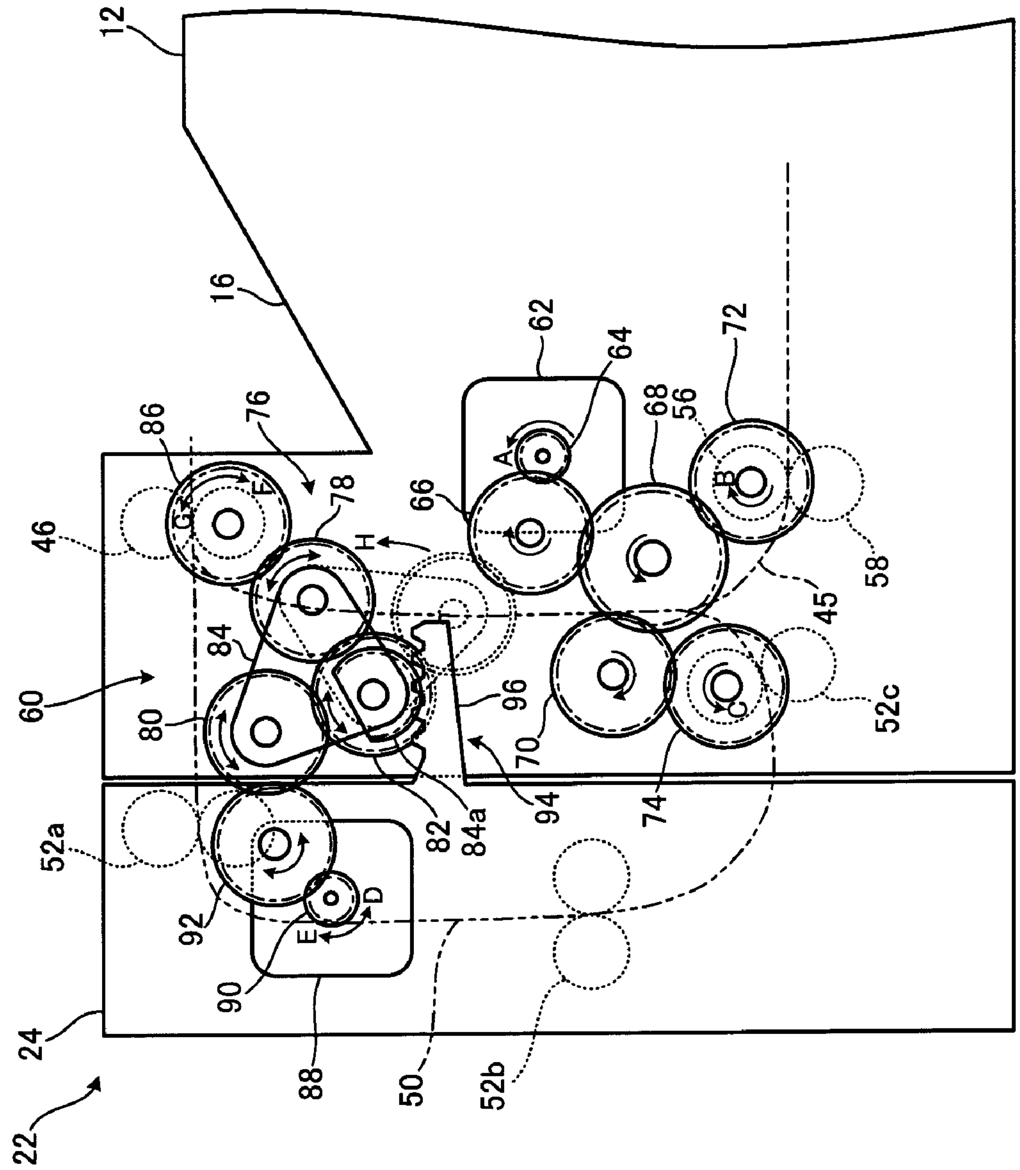
FIG. 4 is a cross sectional diagram illustrating the configuration of the drive switching device and its periphery, when the sheet turnover unit embodied herein is attached to the image forming apparatus main body.

Then, an example of a drive switching mechanism 60 is explained based on FIGS. 2 through 4.

As shown in FIG. 2, a forward rotary motor 62 as a drive unit is installed in the image forming apparatus main body 12. A forward rotary motor gear 64 is positioned on the forward rotary motor 62. This forward rotary motor 62 is a motor running in only one direction (as indicated by arrow A in FIG. 2). In the apparatus main body 12, further, a first idler gear 66, a first connecting gear 68, a second connecting gear 70, a feed gear 72, a transport gear 74, a sway gear train 76, and an output gear 86 are positioned.

The first idler gear 66 is provided on the drive side of the sway gear train 76 and positioned to interlock with a part of the sway gear train 76 when the sway gear train 76 is in a predefined position. The first connecting gear 68 is positioned to interlock with the second connecting gear 70 and the feed gear 72 provided coaxially with the feed roller 56. The second connecting gear 70 is positioned to interlock with the transport gear 74 provided coaxially with one of the transport rollers 52*c*. Thus, the forward rotary motor 62 is arranged to rotate the feed roller 56 in a forward direction (as indicated by arrow B in FIG. 2) via the forward rotary motor gear 64, the first idler gear 66, the first connecting gear 68, and the feed gear 72, and rotate the transport rollers 52*c* in a forward direction (as indicated by arrow C in FIG. 2) via the forward rotary motor gear 64, the first idler gear 66, the first connecting gear 68, the second connecting gear 70, and the transport gear 74.

The output gear 86 is provided coaxially with one of the output rollers 46. The output gear 86 is provided on the load side of the sway gear train 76 and positioned to interlock with a part of the sway gear train 76 when the sway gear train 76 is in a predefined position.

In the sheet turnover unit main body 24, a forward/reverse rotary motor 88 as a drive unit, a forward/reverse rotary motor gear 90, and a second idler gear 92 are installed. The forward/reverse rotary motor 88 is a motor running in two directions; i.e., it is rotatable in both forward and reverse directions (as indicated by arrows D and E in FIG. 2). The second idler gear 92 is positioned to interlock with the forward/reverse rotary motor gear 90. This second idler gear 92 is provided on the drive side of the sway gear train 76 and designed to interlock with a part of the sway gear train 76 when the sheet turnover unit 22 is attached to the image forming apparatus main body 12, as will be described later.

In the sheet turnover unit main body 24, a forward rotary motor running only in one direction may be installed and a drive direction reversing unit may be provided so that the direction of the drive interlocked with the forward rotary motor can be reversed. An additional gear train may be provided that interlocks with the forward rotary motor 62 when the sheet turnover unit is attached to the image forming apparatus main body 12 and the drive direction reversing unit may be provided in the sheet turnover unit main body 24 so that the direction of the drive interlocked with the additional gear train can be reversed.

On the inner side (right side in FIG. 2) of the sheet turnover unit main body 24, a rack 96 like an elongated bar is provided which protrudes horizontally from the sheet turnover unit main body 24.

Also as shown in FIGS. 3A and 3B, the drive switching mechanism 60 includes the sway gear train 76, a sway gear train supporting member 84, and a switching unit 94. The sway gear train 76 is made up of a first sway idler gear 78 as a first gear, a second sway idle gear 80 as a second gear, and a sway fulcrum gear 82.

The sway gear train supporting member 84 is formed in a substantially triangle shape with round vertices and a pinion gear 84*a* is provided in the vicinity of one vertex. The pinion gear 84*a* is formed in a partially cut circle like a D shape and provided integrally with the sway gear train supporting member 84. The sway gear train supporting member 84 is provided with a support axis 78*a* and a support axis 80*a*. The first sway idler gear 78 and the second sway idler gear 80 are rotatably supported on the support axis 78*a* and the support axis 80*a*, respectively.

The sway fulcrum gear 82 is positioned to engage with the first sway idler gear 78 and the second sway idler gear 80 and rotatably supported on a support axis 82*a* provided in the sway gear train supporting member 84. The support axis 82*a* is provided in the center of rotation of the pinion gear 84*a* and coaxially supports the pinion gear 84*a* and the sway fulcrum gear 82. One end of the support axis 82*a* is rotatably provided in the image forming apparatus main body 12.

Thus, the sway gear train supporting member 84 movably supports the first sway idler gear 78 and the second sway idler gear 80.

The switching unit 94 includes the above pinion gear 84*a* and the rack 96 that is engaged with the pinion gear 84*a*. By the engagement of the pinion gear 84*a* and the rack 96, translatory movement of the rack 96 is converted into rotary motion of the pinion gear 84*a* and, thereby, the sway gear train supporting member 84 turns.

When the sheet turnover unit 22 is detached from the image forming apparatus main body 12, as shown in FIG. 2, the forward rotary motor gear 64, the first idler gear 66, the first sway idler gear 78, the sway fulcrum gear 82, the second sway idler gear 80, and the output gear 86 are interlocked together. Thus, the output rollers 46 are driven to rotate in a forward direction (as indicated by arrow F in FIG. 2) by the drive of the forward rotary motor 62.

As shown in FIG. 4, when attaching the sheet turnover unit 22 to the image forming apparatus main body 12 begins, the rack 96 and the pinion gear 84*a* are engaged and the sway gear train supporting member 84 turns on the support axis 82*a* (moves in a direction indicated by arrow H in FIG. 4). At this time, the first sway idler gear 78 and the first idler gear 66 are disengaged and the second sway idler gear 80 and the output gear 86 are disengaged. Upon completion of attaching the sheet turnover unit 22, by a given amount of rotation of the pinion gear 84*a* turned by the lateral movement of the rack 96, the first sway idler gear 78 and the output gear 86 are interlocked and the second sway idler gear 80 and the second idler gear 92 are interlocked. Thereby, the forward/reverse rotary motor gear 90, the second idler gear 92, the second sway idler gear 80, the sway fulcrum gear 82, the first sway idler gear 78, and the output gear 86 are interlocked together. Thus, the output rollers 46 are driven to rotate in both forward and reverse directions (as indicated by arrows F and G in FIG. 2) by the drive of the forward/reverse rotary motor 88.

In this way, switching of the drive that drives the output rollers 46 can be performed by attaching/detaching the sheet turnover unit 22 to/from the image forming apparatus main body 12. Specifically, by the engagement of the rack 96 of the sheet turnover unit 22 and the pinion gear 84*a*, the sway gear train supporting member 84 turns. This turning moves the first sway idler gear 78 and the second sway idler gear 80 to reverse the output direction of the drive switching mechanism 60. In this way, the input and output gears in the drive switching mechanism 60 are used to transmit the drive. This avoids useless idle running of at least the input and output gears and can suppress vibration and noise.

By use of the rack 96 and the pinion gear 84*a* as the switching unit, the first sway idler gear 78 and the second sway idler gear 80 can be moved to a greater extent than the amount of movement of the sheet turnover unit 22. This makes it easy to lay out gear trains in various ways. Moreover, by changing the gear ratio between the rack 96 and the pinion gear 84*a*, the amount of movement of the sheet turnover unit main body 24 and the amount of rotation of the sway gear train supporting member 84 can be adjusted easily.

When the sheet turnover unit 22 is attached to the image forming apparatus main body 12, the output rollers 46 can be rotated in both forward and reverse directions by the forward/reverse rotary motor 88 within the sheet turnover unit main body 24. Accordingly, the structure inside the image forming apparatus main body 12 can be simplified, as compared with the image forming apparatus main body 12 incorporating the switching unit. When the sheet turnover unit 22 is not in use, noise and power consumption can be suppressed, as compared with the image forming apparatus main body 12 incorporating another motor for reversing the rotation of the output rollers 46.

Figure 5:
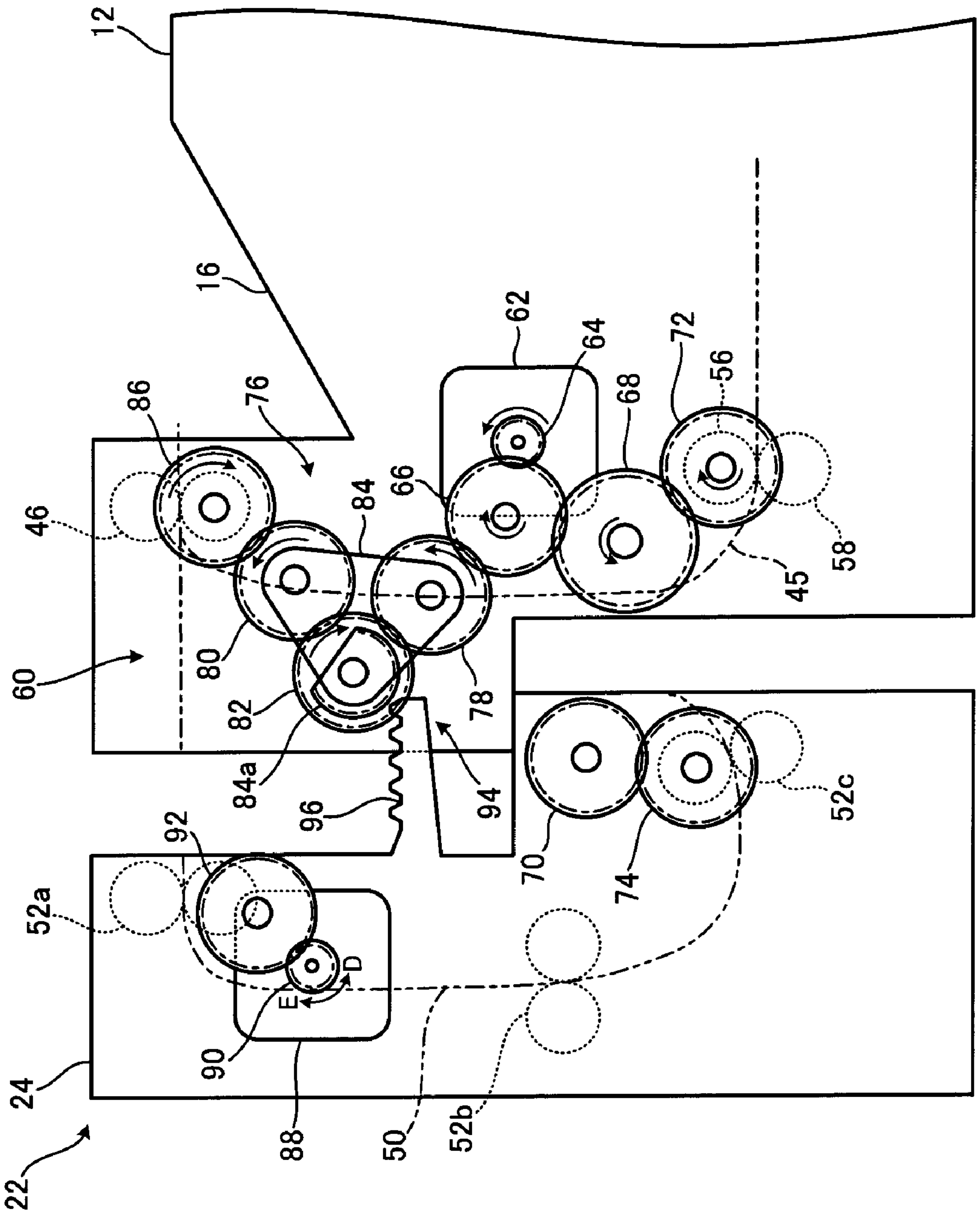
FIG. 5 is a cross sectional diagram illustrating a configuration of the drive switching device and its periphery, when a sheet turnover unit embodied according to a second exemplary embodiment of the invention is detached from the image forming apparatus main body.

Next, a second exemplary embodiment is described based on FIG. 5.

The sheet turnover unit main body 24 configured according to the second exemplary embodiment includes the following: a forward/reverse rotary motor 88, as a drive unit, which is rotatable in both forward and reverse directions (as indicated by arrows D and E in FIG. 5); a forward/reverse rotary motor gear 90; a second idler gear 92; a second connecting gear 70; and a transport gear 74. The second connecting gear 70 is positioned to interlock with the transport gear 74 provided coaxially with one of the transport rollers 52*c*. The second connecting gear 70 is designed to interlock with the first connecting gear 68 when the sheet turnover unit 22 is attached to the image forming apparatus main body 12.

In this way, by providing the second connecting gear 70 and the transport gear 74 in the sheet turnover unit main body 24, useless rotation of the transport rollers 52*c* can be prevented when the sheet turnover unit 22 is detached. When the sheet turnover unit 22 is detached, the image forming apparatus main body 12 can be more compact.

As described hereinbefore, the present invention can be applied to a drive switching device and an image forming apparatus including such device for which vibration and noise have to be suppressed.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A drive switching mechanism comprising a first gear, a second gear, an output side gear, a first input side gear, wherein the first input side gear is driven by a first motor, a second input side gear, wherein the second input gear is driven by a second motor, a support member for movably supporting the first gear and the second gear, and a switching unit that moves the support member to a first position at which the first gear engages with the first input side gear and the second gear engages with the output side gear and a second position at which the first gear engages with the output side gear and the second gear engages with the second input side gear.

2. The drive switching mechanism according to claim 1, further comprising a sway gear engaging with the first gear and the second gear, wherein the sway gear is rotatably supported on the support member.

3. The drive switching mechanism according to claim 1, further comprising a pinion gear secured to the support member, wherein the switching unit includes a rack engaging with the pinion gear.

4. The drive switching mechanism according to claim 2, further comprising a pinion gear secured to the support member, wherein the switching unit includes a rack engaging with the pinion gear.

5. The drive switching mechanism according to claim 3, wherein the pinion gear is coaxial with the sway gear.

6. The drive switching mechanism according to claim 4, wherein the pinion gear is coaxial with the sway gear.

7. An image forming apparatus comprising:

an image forming apparatus main body;

an image forming unit that forms an image on a sheet, provided in the image forming apparatus main body;

output rollers that, in a both-side printing mode, output a part of a sheet, on one side of which an image has been formed by the image forming unit, out of the image forming apparatus main body, and then transport the sheet in a reverse direction;

a sheet turnover unit that is removably attached to the image forming apparatus main body and turns over and further transports again the sheet transported by the output rollers to the image forming unit;

a drive unit that drives the output rollers, provided in the image forming apparatus main body; and a drive switching mechanism that interlocks the drive unit with the output rollers;

the drive mechanism including a first gear, a second gear, an output side gear, a first input side gear, wherein the first input side gear is driven by a first motor, a second input side gear, wherein the second input gear is driven by a second motor, a support member for movably supporting the first gear and the second gear, and a switching unit that moves the support member to a first position at which the first gear engages with the first input side gear and the second gear engages with the output side gear and a second position at which the first gear engages with the output side gear and the second gear engages with the second input side gear.

8. The image forming apparatus according to claim 7, further comprising a sway gear engaging with the first gear and the second gear, wherein the sway gear is rotatably supported on the support member.

9. The image forming apparatus according to claim 7, further comprising a pinion gear secured to the support members, wherein the switching unit includes a rack engaging with the pinion gear.

10. The image forming apparatus according to any of claim 8, further comprising a pinion gear secured to the support member, wherein the switching unit includes a rack engaging with the pinion gear.

11. The image forming apparatus according to claim 9, wherein the pinion gear is coaxial with a sway gear rotatably supported on the support member.

12. The image forming apparatus according to claim 10, wherein the pinion gear is coaxial with the sway gear.

13. The image forming apparatus according to claim 9, wherein the rack is provided integral with the sheet turnover unit.

14. The image forming apparatus according to claim 10, wherein the rack is provided integral with the sheet turnover unit.

15. The image forming apparatus according to claim 11, wherein the rack is provided integral with the sheet turnover unit.

16. The image forming apparatus according to claim 12, wherein the rack is provided integral with the sheet turnover unit.

17. The image forming apparatus according to claim 7, wherein the sheet turnover unit further comprises a drive unit that drives the output rollers.

18. The image forming apparatus according to claim 17, wherein the sheet turnover unit incorporates a drive direction reversing unit that interlocks with the drive and can reverse a drive direction.

* * * * *